United States Patent [19]

Hansen

[11] Patent Number: 4,901,980
[45] Date of Patent: Feb. 20, 1990

[54] PORTABLE CAR HOIST AND TRAILER WITH REMOVABLE WHEELS

[75] Inventor: N. Larry Hansen, Ft. Collins, Colo.

[73] Assignee: Johnson Industries, Inc., Salina, Kans.

[21] Appl. No.: 44,819

[22] Filed: Apr. 29, 1987

[51] Int. Cl.⁴ .............................................. B60P 1/48
[52] U.S. Cl. ................................ 254/9 C; 254/8 C; 254/88; 254/90; 254/124
[58] Field of Search ............... 254/9 R, 9 B, 9 C, 8 R, 254/8 B, 8 C, 124, 88, 90, 122; 187/8.47, 8.49, 8.5, 8.67

[56] References Cited

U.S. PATENT DOCUMENTS

| | | | |
|---|---|---|---|
| 1,926,996 | 10/1934 | Jones | 187/8.49 |
| 3,084,908 | 5/1963 | Klein | 254/8 R |
| 3,190,395 | 6/1965 | Lill | 187/8.67 |
| 3,220,585 | 11/1965 | McCartney | 254/8 C |
| 4,445,665 | 3/1982 | Cray | 254/90 |

Primary Examiner—Judy J. Hartman
Attorney, Agent, or Firm—James R. Young

[57] ABSTRACT

Portable car hoist convertible to a trailer which has wheels for towing a vehicle. The hoist includes a trailer with a suspension, a wheel assembly, a base frame assembly, a liftable platform assembly, and a lift apparatus. A foldable ramp, a platform, and extension channels support a vehicle to be lifted, and a chock assembly retains the vehicle on the platform. A safety latch prevents accidental lowering of the platform assembly.

31 Claims, 6 Drawing Sheets

PORTABLE CAR HOIST AND TRAILER WITH REMOVABLE WHEELS

BACKGROUND OF THE INVENTION

1. Field of the Invention

This invention relates to portable lifting devices and more specifically to a portable hoist in the form of a trailer for lifting cars and other vehicles off the ground.

2. Description of the Prior Art

It is well-known, of course, that cars and other vehicles have to be lifted off the ground in order to examine the underside or to perform maintenance and repair work on parts and components that are located on the bottom or underside of the vehicle. Hoists and lifts for lifting vehicles above the ground or above floors in repair shops for such purposes are also well-known. However, such known hoists or lifts are usually permanent installations that cannot be moved easily or conveniently from one place to another without disassembly. They also usually require special pits and openings in concrete floors for proper installation and stability during use. As a result, such known hoists or lifts are quite expensive and are usually not available to persons who do not have access to a repair shop or garage that is specially constructed with a hoist. Even when such a facility is available, the vehicle has to be driven to the facility, since the hoist or lift installation is permanently fixed and immovable for practical purposes.

Therefore, firms, such as construction companies, loggers, military units, ranchers, and others who often work with vehicles in remote locations find it difficult to perform even routine maintenance and repairs on the undersides of vehicles at such remote locations. Also, most amateur mechanics and hobbiests who want to perform such work on their vehicles at their homes usually do not have, and cannot afford, conventional car hoists in their residential garages, back yards, or driveways.

Therefore, the traditional methods left for such remote area mechanics and amateur home mechanics and hobbiests include the use of jacks and blocks or raised wheel ramps to lift the vehicle high enough to crawl underneath or positioning the vehicle over a pit. These methods, while widely used, are inherently uncomfortable, often unsafe if done improperly, and time-consuming.

SUMMARY OF THE INVENTION

Accordingly, it is a general object of this invention to provide a more convenient, cost-effective car hoist for use in locations where permanent car hoist or lift installations are unavailable.

It is a more specific object of this invention to provide a portable car hoist that can be moved from place to place.

It is also a specific object of this invention to provide a portable car hoist that is compact and easily movable and which is safe and convenient to use for lifting cars and other vehicles.

A further object of this invention is to provide a portable car hoist that can be towed from place to place.

A still further object of this invention is to provide a portable car hoist that can be converted easily into a compact trailer on wheels that can be towed easily and conveniently from one place to another.

Yet another object of the present invention is to provide a collapsible trailer on wheels that can be conveniently and easily lowered to the ground and from which the wheels can be removed easily and conveniently.

Additional objects, advantages, and novel features of this invention are set forth in part in the description that follows, and in part will become apparent to those skilled in the art upon examination of the following specification or may be learned by the practice of the invention. The objects and advantages of the invention may be realized and attained by means of the instrumentalities and in combinations particularly pointed out in the appended claims.

To achieve the foregoing and other objects and in accordance with the purposes of the present invention, as embodied and broadly described herein, the apparatus of this invention may comprise a portable hoist in the form of a trailer with suspension and wheel assembly, base frame assembly, liftable platform frame assembly, and lift apparatus. The lift apparatus interacts with the base frame assembly and platform assembly to raise the platform assembly and with the suspension and wheel assembly to lower the base frame assembly to the ground for stability. The suspension and wheel assembly is easily removable when the base frame assembly is lowered to the ground, but it cannot be removed when the base frame assembly is supported on the wheels and transported as a trailer. Foldable ramp, platform, and extension channels are provided to support a vehicle being lifted by the hoist, and a chock assembly retains the vehicle on the platform. A safety latch assembly is provided to prohibit undesired or unexpected lowering of the platform assembly.

BRIEF DESCRIPTION OF THE DRAWINGS

The accompanying drawings, which are incorporated in, and form a part of, the specifications illustrate the preferred embodiments of the present invention, and together with the description, serve to explain the principles of the invention. In the drawings.

DETAILED DESCRIPTION OF THE PREFERRED EMBODIMENT

Figure 1:
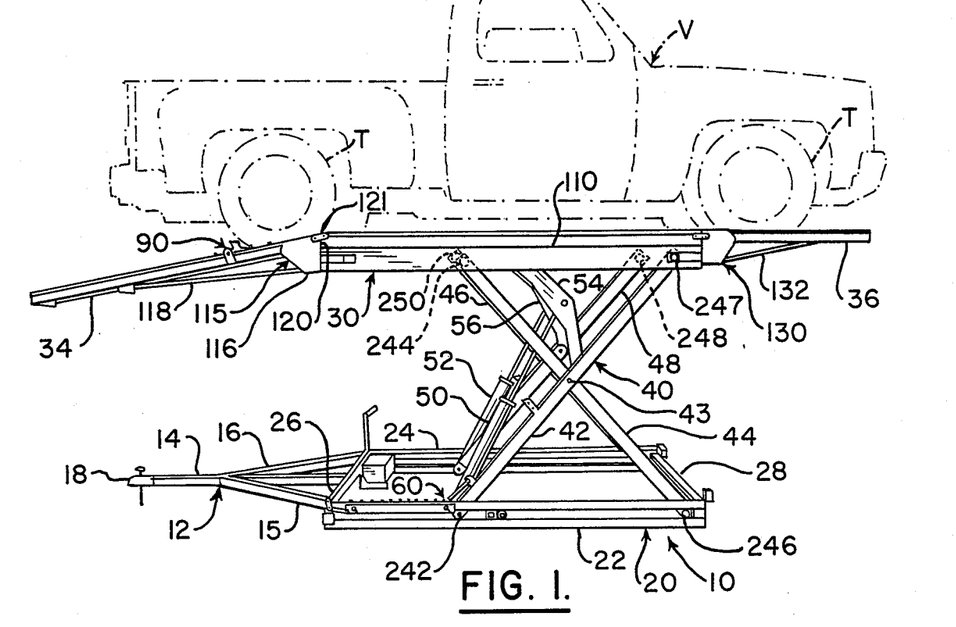
FIG. 1 is a perspective view of the portable hoist according to the present invention in its use configuration with a vehicle shown positioned thereon raised to an appropriate level above the ground where a person can get underneath the vehicle to gain access to the underside of the vehicle.

The portable hoist 10 according to the present invention is illustrated in FIG. 1 as it is used to support a vehicle V a spaced distance above the ground. As shown in this view, the portable hoist 10 is comprised essentially of a base frame assembly 20 positioned on the ground or on a floor or other suitable support surface, a platform assembly 30 on which the vehicle V is positioned, and a lift assembly 40 connected between the base frame assembly 20 and the platform assembly 30 for lifting the platform assembly 30 and vehicle V above the base frame assembly 20 as desired. These components will be described in more detail below; however, some of the more basic features necessary for a more thorough understanding of the principle structure and operation of this portable hoist 10 are explained first. For example, the base frame assembly 20 is preferably a rectangular configuration and is comprised of a left frame 22 and a right frame 24, both of which are connected together at their forward and aft ends by a front frame member 26 and a rear frame member 28, respectively. A removable hitch assembly 12 is shown attached to the front frame member 26. This removable hitch assembly 12 is comprised of a tongue 14, left and right braces 15, 16, respectively, and a conventional ball socket connector 18. The platform assembly 30 is essentially comprised of a pair of platform channels 32, 33 (only channel 32 can be seen in this FIG. 1), a pair of elongated ramp channels 34, 35 (only ramp channel 34 can be seen in this FIG. 1), and a pair of front extension channels 36, 37 (only extension channel 36 can be seen in this FIG. 1). The vehicle V is driven on to the platform assembly 30 with its wheels or tires T positioned in the channels as shown.

The lift assembly 40 is comprised of a pair of scissors arms 42, 44 attached to the left sides of both the base frame assembly 20 and the platform assembly 30, and a similar pair of scissors arms 46, 48 are attached to the right sides of both the base assembly 20 and platform assembly 30. A pair of hydraulic cylinders 50, 52 are attached between the base frame assembly 30 and a pair of respective lift arms 54, 56, respectively. The lift arms 54, 56 are attached to the platform assembly 30 in such a manner that extension of the hydraulic cylinders 50, 52 causes the lift arms 54, 56 to push the platform assembly 30 upwardly in relation to the base frame assembly 20, thus lifting the platform assembly 30 and vehicle V above the ground.

A safety latch assembly 60, which will be described in more detail below, is provided to prevent the platform assembly 30 from collapsing toward the base frame assembly 20 upon loss of hydraulic pressure in cylinders 50, 52. Also, a chock assembly 90, which will also be described in more detail below, is provided on the ramp channels 34, 35 to prevent the vehicle V from rolling off the platform assembly 30.

Figure 2:
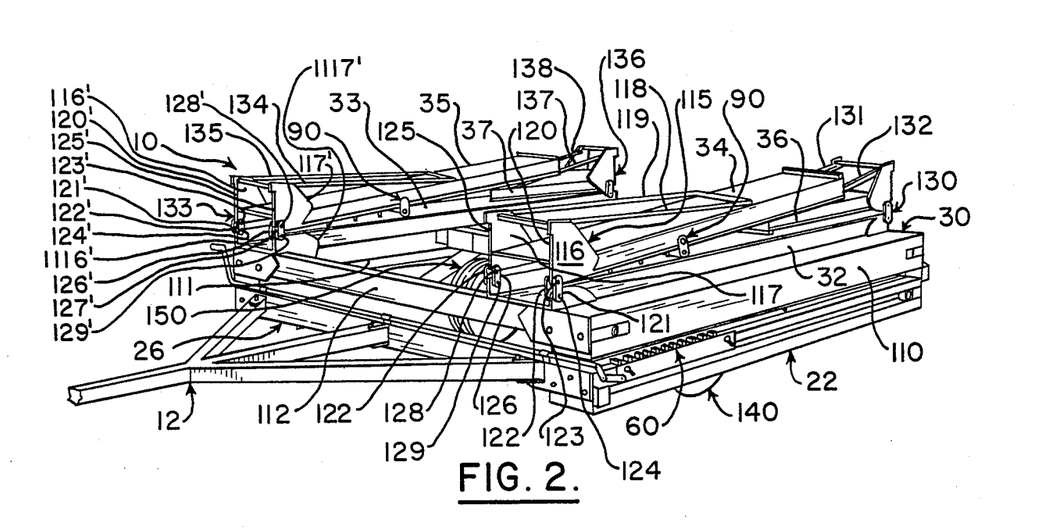
FIG. 2 is a perspective view of the portable hoist according to the present invention with the ramps and extensions folded into a compact position and with the wheel assemblies of this invention in place so that it can be towed from one place to another.

The portable hoist 10 according to this invention is shown in FIG. 2 in its folded up, portable configuration in which it can be towed or stored. Specifically, the lift assembly 40 shown in FIG. 1 is collapsed in FIG. 2 so that the platform assembly 30 is lowered onto the base frame assembly 20. The extension channels 36, 37 are folded back over the respective platform channels 32, 33. Likewise, the ramp channels 34, 35 are folded over the respective platform channels 32, 33. Also, as will be described in more detail below, a pair of wheel assemblies 140, 150 are mounted on he left and right frame members 22, 24, respectively, to carry the portable hoist 10. In this configuration, with the hitch assembly 12 in place as shown in FIG. 2, the portable hoist 10 can be towed easily from one place to another by any vehicle equipped for towing a trailer.

The folding mechanism for the ramp channels 34, 35 and for the extension channels 36, 37 are best described in more detail by reference to FIGS. 1, 2, and 3. Specifically, the left ramp channel 34 is pivotally attached to the front edge of the left platform channel 32 by a hinge assembly 115. Likewise, the right ramp channel 35 is pivotally attached to the right platform channel 33 by a hinge assembly 133. In a similar manner, the left extension channel 36 is pivotally attached to the rear edge of the platform channel 32 by a hinge assembly 130, and the right extension channel 37 is pivotally attached to the rear edge of the platform channel 33 by hinge assembly 136. While each of the hinge assemblies 115, 130, 133, and 136 connect different components together, as described above, they all have essentially the same structure. Therefore, this description will focus primarily on the front right hinge assembly 133, because the FIGS. 2, 5, 10, and 14 can be used to best illustrate the structural details, with the understanding that the parts and components to be described are typical of corresponding parts and components used in hinge assemblies 115, 130, and 136.

Referring now to FIGS. 2, 5, 10, and 14 hinge assembly 133 is comprised of two flat plates 116′ 117′ rigidly attached to opposite sides of the ramp channel 35 and two additional flat plates 1116′, 1117′, rigidly attached to opposite sides of the platform channel 33. The plates 116′, 117′ are each pivotally attached to respective plates 1116′, 1117′ at opposite sides of the front end of platform channel 33. Specifically, two elongated hinge links 121′, 122′ are positioned on opposite sides of plate 116′, 1116′ and pivotally connected thereto by a pivot pin 123′ 124′. Similarly, a pair of links 126′, 127′ are pivotally connected to opposite sides of plate 117′, 1117′ by pins 128′, 129′.

Figure 5:
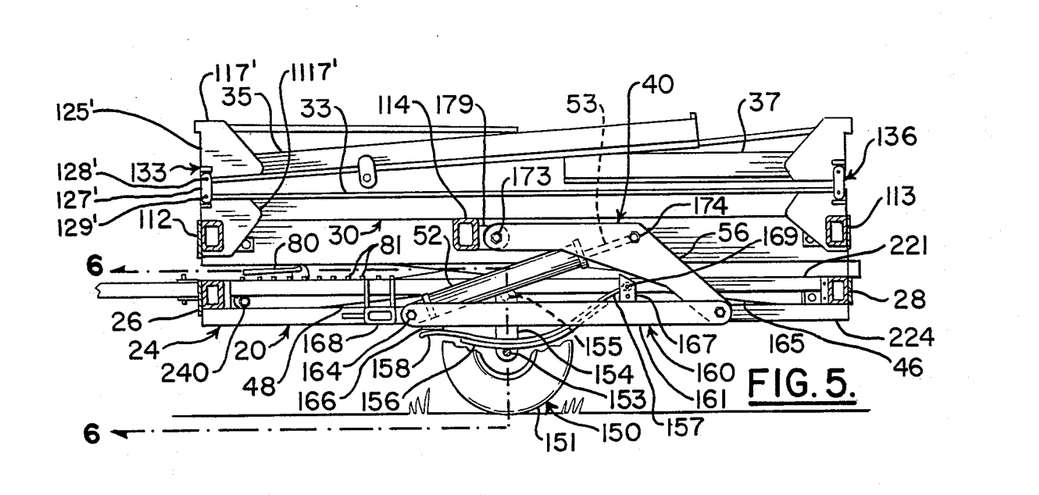
FIG. 5 is a cross-sectional view of the portable hoist taken along lines 5—5 of FIG. 4 and in the folded configuration with the wheel assembly in place for transport.
Figure 10:
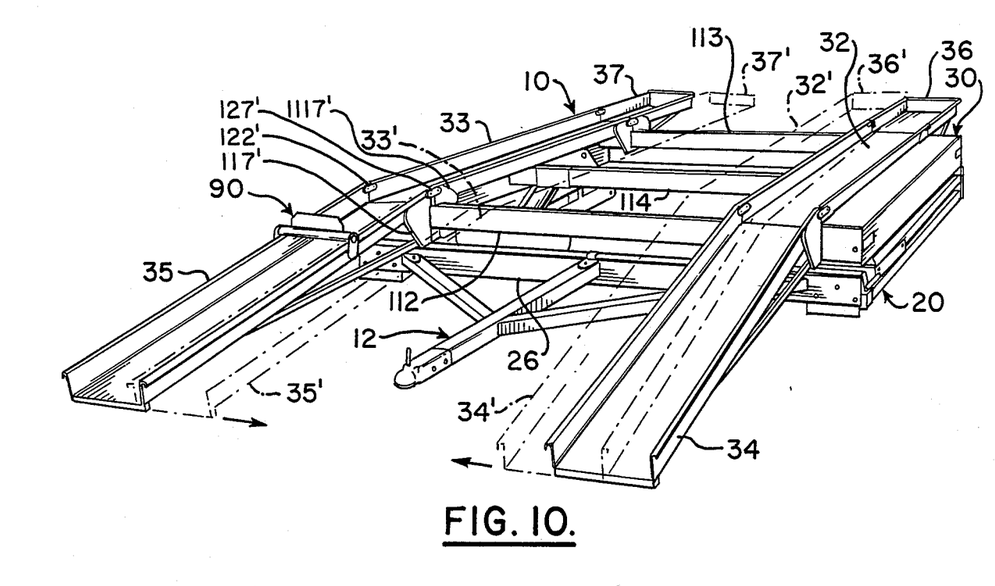
FIG. 10 is a perspective view of the portable hoist without the wheel assemblies mounted and shown lowered to its full extent and with the ramp and extensions unfolded to a position where a vehicle can be driven thereon.
Figure 14:
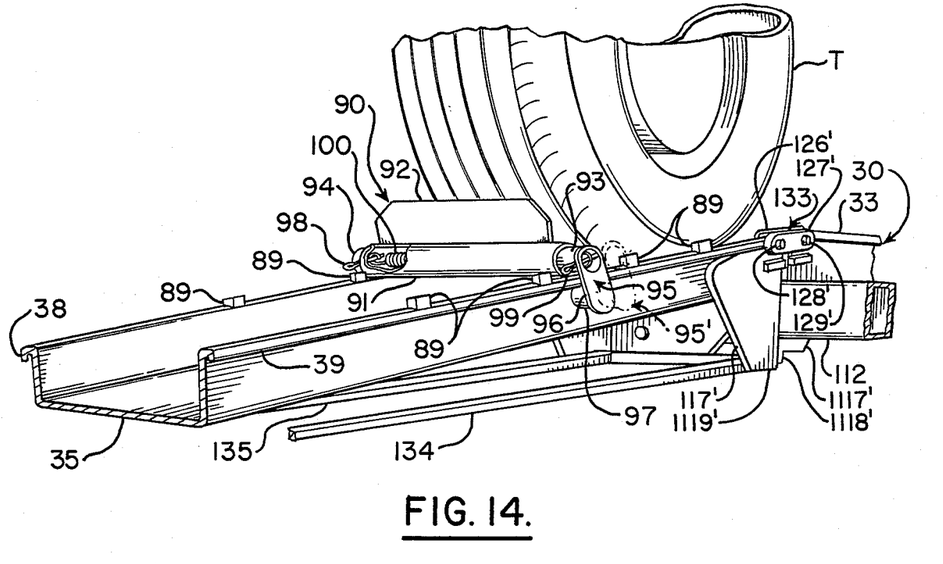
FIG. 14 is an enlarged perspective view of the chock assembly according to the present invention mounted on the right ramp channel with a portion of a vehicle tire positioned in the ramp channel and blocked by the chock assembly.

Therefore, ramp channel 35 can be pivoted from its folded position illustrated in FIG. 2 and 5, to its extended position, as illustrated in FIGS. 10 and 14. In its extended position, as shown in FIGS. 10 and 14, the bearing faces 120′, 125′ of respective plates 116′, 117′ abutt against the front frame member 112 of platform assembly 30. Therefore, these bearing faces 120′, 125′ hold the ramp channel 35 in an outwardly extending position as shown in FIG. 1. The plates 1116′, 1117′ bear against the inside surface of front frame member 112 to provide additional stiffener support. As best seen in FIG. 14, the distal ends 1118′, 1119′ can be shaped to also abutt each other for bearing support. Brace bars 134, 135, as seen in FIGS. 2, 5, 10, and 14, can extend from the plates 116′, 117′, respectively, to the midportions of ramp channel 35 to reinforce and support the ramp channel 35 in this extended position.

As mentioned above, the hinge assemblies 115, 130, 136 are essentially same in structure and components as the hinge assembly 135 described above. For example, as shown in FIG. 2, plates 116, 117 of hinge 115 mounted on ramp channel 34 are pivotally connected to plates 1116, 1117 on platform channel 32. Links 121, 122 with pins 123, 124 connect plates 116, 1116 together, and links 126, 127 with pins 128, 129 connect plates 117, 1117 together. Also, braces 131, 132 extending between hinge assembly 130 and the extension channel 36 support the ramp 36 in its extended position as shown in FIG. 1. Likewise, braces 137, 138 are provided for the extension channel 37, and braces 118, 119, are provided for the ramp channel 34.

A significant feature of this invention is in the combination of the lift assembly 40 with the removable wheel assemblies 140, 150. This feature is best described by reference to FIGS. 3 through 10. The specific structural components of the lift assembly 40 and the wheel assemblies 140, 150 and the interrelationship of those components will be described in more detail below. However, before describing all of the structural components in detail, it is helpful for understanding and appreciating of the invention to first describe the beneficial functions of these features.

Figure 3:
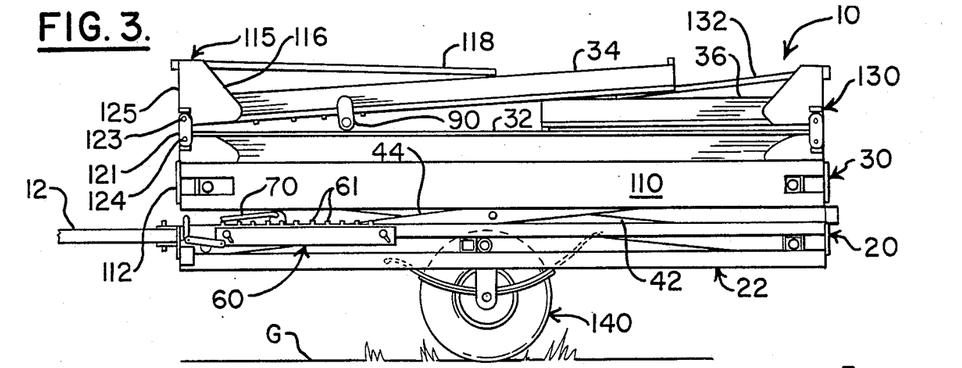
FIG. 3 is an elevation view of the left side of the portable hoist of the present invention in its folded configuration and mounted on the wheel assemblies for transport according to this invention.
Figure 4:
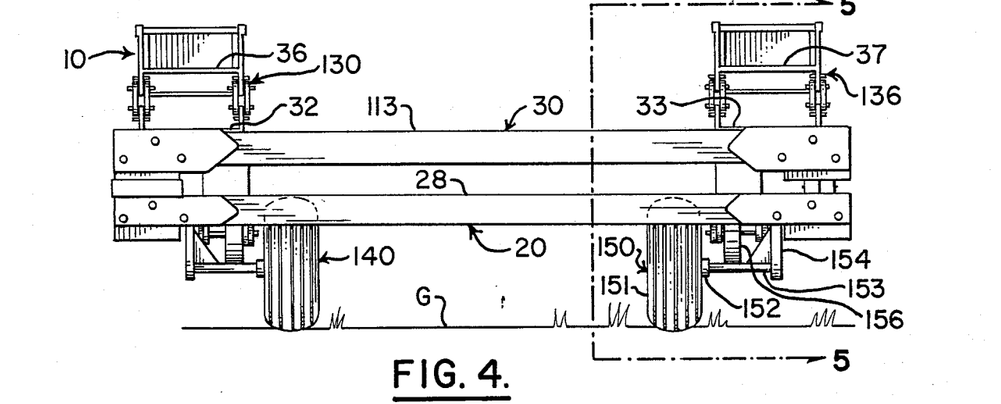
FIG. 4 is a rear elevation view of the portable hoist in the folded configuration and mounted on the wheel assemblies for transport.

The portable hoist 10 of the present invention is shown in FIGS. 3, 4, and 5 in its compact, folded configuration and supported on its wheel assemblies 140, 150. In this folded, wheel-supported configuration, the portable hoist 10 can be towed from one place to another or stored compactly without requiring much space, as described above. However, this configuration is obviously not suitable for supporting a vehicle on its platform assembly 30. Not only do the ramp platforms 34, 35 and the extension platforms 36, 37 have to be folded out, as described in detail above, but more importantly the hoist supported by the wheel assemblies 140, 150 would be far too unstable to safely lift and support a vehicle. Therefore, this portable hoist 10 has been designed so that its wheel assemblies 140, 150 can be removed easily and quickly with the base frame assembly 20 resting directly on the ground where it can safely support the raised platform assembly 30 in a stable manner, even with a vehicle V positioned thereon.

Figure 7:
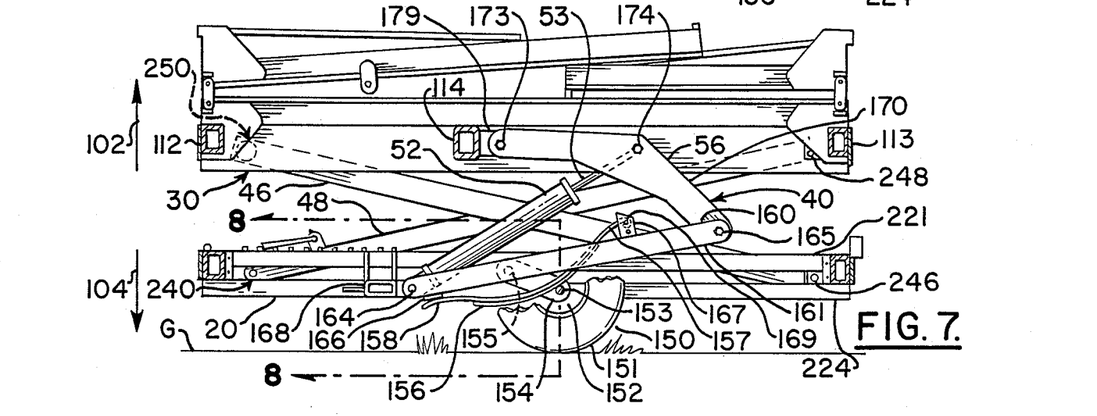
FIG. 7 is a cross-sectional view similar to that in FIG. 5, but with the platform assembly partially raised and the wheel assembly partially collapsed to begin lowering the base frame assembly toward the ground.

According to this invention and because of its unique structure, as the lift assembly 40 begins to raise the platform assembly 30 above the base frame assembly 20, the wheel assemblies 140, 150 begin to collapse, as shown in FIG. 7, so that the base frame assembly 20 settles toward the ground G. As illustrated in FIG. 7, activation of the lift assembly 40 causes the platform assembly 30 to raise, as indicated by arrow 102, while the base frame assembly 20 settles simultaneously toward the ground G, as indicated by arrow 104.

Figure 9:
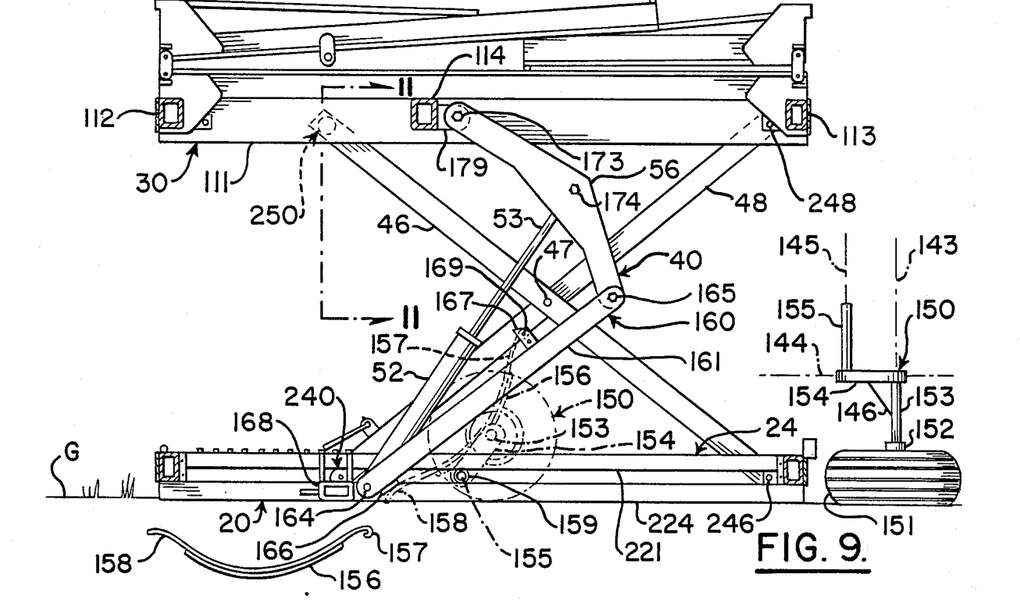
FIG. 9 is a cross-sectional view similar to those of FIGS. 5 and 7, but with the platform assembly raised substantially all the way up to its maximum extent and with the wheel assembly fully collapsed and removed so that the base frame assembly rests entirely on the ground.

As illustrated in FIG. 9, while the lift assembly 40 continues to raise the platform assembly 30 farther above the ground G, the base frame assembly 20 continues simultaneously to settle downwardly until it rests directly on the ground G. In this position, there is no longer any weight on the wheel assembly 150, therefore, the wheel assembly 150 can be removed very easily by hand without the aid of jacks, blocks, or other similar implements or tools, and simply laid aside. Then, the lift assembly 40 can be reversed to lower the platform assembly 30 downwardly onto the top of base frame 20 to its completely collapsed position firmly on the ground, as illustrated in FIG. 10. Also, as illustrated in FIG. 10, in this completely collapsed, stable position with the wheel assemblies 140, 150, removed, and the base frame assembly 20 resting firmly on the ground, the ramp platform channels 34, 35 and the extension channels 36, 37 can be folded to the extended positions. Then, with the hoist 10 in this collapsed, unfolded configuration in FIG. 10, a vehicle can be driven safely onto the platform assembly 30. Once the vehicle V is safely on the platform assembly 30, the lift assembly 40 can be actuated again to raise the vehicle V above the ground, as illustrated in FIG. 1. In this raised position shown in FIG. 1, with the base frame assembly 20 firmly positioned on the ground without the wheel assemblies 140, 150, in place, the structure is very stable and can support a vehicle V above the ground safely.

The lift assembly 40 of the portable hoist 10 according to the present invention is best described by reference to FIGS. 1, 3–9, 11 and 12. An overview of the lift assembly 40 can be obtained first by reference to FIG. 1 wherein a scissors support structure comprised of scissors arms 42, 44, 46, 48 extending between the base frame assembly 20 and the platform assembly 30 function to stabilize the platform assembly 30 as it holds a vehicle V a distance above the ground. The scissors arm 42 is attached pivotally at its upper end by a pivot pin 247 to the left platform frame beam 110 and confined at its lower end in left frame 22 by a roller assembly 242. Similarly scissors arm 44 is attached pivotally at its lower end by a pivot pin 246 to left frame 22 and is mounted by a roller assembly 244 in left platform frame beam 110. Although it is not seen as clearly in FIG. 1 as in subsequent figures due to intervening component parts, it can be understood that scissors arm 46 is attached pivotally at its lower end to right frame member 24 and is mounted at its upper end by roller assembly 50 in right platform frame beam 111. Scissors arm 48 is pivotally attached at its upper end to right platform frame 111 and is mounted by a roller assembly (not shown) in right frame member 24. Scissors arms 42, 44 are connected together at their midpoints by a pivot pin 43. Similarly, the scissors arms 46, 48 are connected together at their midpoints by another pivot pin 47, which cannot be seen in FIG. 1, but which is shown in FIG. 9. Therefore, scissors arms 42, 44 stabilize and support the left side of the platform assembly 30, and scissors arms 46, 48 stabilize and support the right side of the platform assembly 30.

A pair of hydraulic cylinders 50, 52 connected to a pair of lift arms 54, 56 in a manner that will be described in more detail below are used to raise the platform assembly 30 above the base frame assembly 20. As the platform assembly 30 is raised by hydraulic cylinders 50, 52, the lower roller assemblies 240 (shown in FIGS. 7 and 9) and the roller assemblies 242, 244, 250 (shown in FIG. 1) translate or roll rearwardly in their respective frame members 22, 24, 110, 111. Similarly, as the hydraulic cylinders 50, 52 allow the platform assembly 30 to lower toward the base spring assembly 20, the roller assemblies 240, 242, 244, 250 translate or roll forwardly in their respective frame members.

Figure 11:
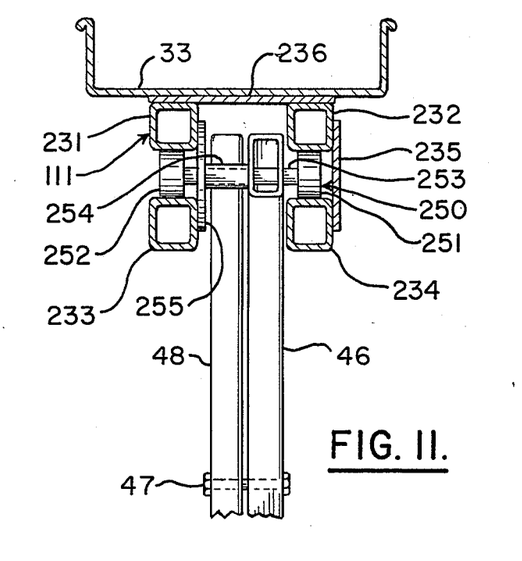
FIG. 11 is a cross-sectional view of the upper right platform frame taken along lines 11—11 of FIG. 9 to illustrate a typical roller assembly.

One of these roller assemblies 250 mounted in right platform beam 111 is shown in more detail in FIG. 11, which is a cross-section taken along lines 11—11 in FIG. 9. While only this roller assembly 250 is described in detail for the purposes of this specification, it is typical of the remaining three roller assemblies 240, 242, 244 as well. Therefore, the following description of the roller assembly 250 can be taken to also apply to roller assemblies 240, 242, 244. In FIG. 11, the right platform beam 111 is shown to be comprised of four tubular frame members 231, 232, 233, 234 positioned parallel to each other in a box-like configuration. Reinforcing plates 235, 236 are rigidly affixed to the tubular frame members 232, 234, and to the tubular members 231, 232, respectively. The right platform channel 33 is shown mounted on and supported by the top reinforcing plate 236.

The outside tubular frame members 231, 233 are spaced apart from the inside tubular frame members 232, 234 a sufficient distance so that the respective upper ends of scissors arms 46, 48 extend therebetween. As described previously, the upper end of scissors arm 48 is pivotally attached to the right platform beam 111 by the pivot pin 248, which can be seen in FIG. 1, but which cannot be seen in FIG. 11 because in FIG. 11 it is positioned behind the shaft 253. As shown in FIG. 11, the roller assembly 250 is comprised of a short sleeve 254 rigidly affixed to and extending laterally from the upper end of scissors arm 46 toward the tubular frame members 231, 233. A circular guide plate 255 is rigidly affixed to the distal end of sleeve 254 and is sized and spaced to bear against, but is not attached to, the inside surfaces of frame members 231, 233. An elongated axle shaft 253 extends from a position between the outer frame members 231, 233 through the sleeve 254 and through the end of scissors arm 46 to a position between the inside frame members 232, 234. A roller 252 positioned between the frame member 231, 233 is mounted on one end of the axle 253, and a similar roller 251 positioned between frame members 232, 234 is mounted on the opposite end of the axle 253.

Therefore, as the lift assembly 40 raises the platform assembly 30 upwardly, as described above, the roller assembly 250 moves or rolls rearwardly in the beam 111 to maintain the frame 111 in a horizontal position. Then, as the lift assembly 40 lowers the platform assembly 30, the roller assembly 250 moves or rolls forwardly again to continue supporting the beam 111 while keeping it stable in a horizontal position. As mentioned above, the remaining roller assemblies 240, 242, 244 are all similar in structure to roller assembly 250, and they function in a very similar manner to maintain the entire platform assembly 30 in a stable, horizontal orientation as it raises upwardly and lowers downwardly in relation to the base frame assembly 20.

The removable suspension and wheel assembly 150 is best described with reference to FIGS. 5 through 9. First, referring primarily to FIG. 9, the wheel assembly 150 shown laying on the ground at the rear of portable hoist 10 is comprised of a tire 151 mounted on a wheel and hub 152. The hub 152 is journaled on the distal end of an axle shaft 153. The proximal end of the axle shaft 153 is rigidly attached to one end of an elongated suspension arm 154, the longitudinal axis 144 of which is perpendicular to the longitudinal axis 143 of the axle 153. A mounting shaft 155 is rigidly attached to the other end of the suspension arm 154 with its longitudinal axis 145 oriented in spaced apart parallel relationship to an extension of the longitudinal axis 143 of axle 153. In other words, the axle shaft 153 and the mounting shaft 155 are rigidly affixed to opposite sides and to opposite ends of the arm 154, but in essentially parallel spaced-apart relation to each other. Finally, a reinforcing web 146 rigidly affixed to the intersection of the axle 153 and suspension arm 154 reinforces the wheel assembly structure so that it maintains the configuration described above, in spite of carrying the weight of the portable hoist 10 in transit.

Also as shown in FIG. 9, a leaf-type suspension spring 156 is provided with a curled end 157 through which a mounting pin can be inserted and a curved opposite end 158 for bearing against a load member to be described below. This suspension spring 156 can be considered as part of the suspension and wheel assembly 150 and is shown in FIG. 9 removed from the portable hoist 10 as the base frame assembly 20 rests on the ground G.

The suspension an wheel assembly 150 is also shown in phantom lines in FIG. 9 as it appears when mounted on the base frame 20 ad lift assembly 40. The mounting shaft 155 is shown mounted pivotally in sleeve 159. The curled end 157 of spring 156 is attached by pin 169 to a bracket 167 near the upper end of strut 160 of lift assembly 40. The opposite curved end 158 of the spring is adapted to bear against a bearing plate 166 on the lower end of strut 160, and the midportion of spring 156 is adopted to bear against axle shaft 153.

Referring now to FIG. 5, the portable hoist 10 is shown in its folded configuration with the platform assembly 30 lowered to its collapsed position directly over the base frame assembly 20 and with the right wheel assembly 150 mounted in place and supporting the base frame assembly 20 above the ground G for transportation. In addition to FIG. 5, reference is also made to FIG. 6, which shows the wheel assembly 150 in cross-section mounted on the portable hoist in substantially the same position as that illustrated in FIG. 5. The left frame beam 22 is shown comprised of four elongated tubular frame members 121, 122, 123, 124 positioned in spaced apart relation to each other in a cross-sectional box-like configuration. The sleeve for the mount 159 is rigidly affixed at one end to the inside frame members 121, 124 and at the other end to the outside frame members 122, 123 so that it extends transversely through the right frame beam 122. The mounting shaft 155 of the wheel assembly 150 is positioned rotatably in the sleeve 159 so that the suspension arm 154 is positioned along side the inside and extending downwardly from the inside frame members 121, 124. The axle 153 extends from the lower end of the suspension arm 154 under the parallel bars 161, 162, that comprise the lower strut 160 of the lift assembly 40 to the hub 152. Therefore, the tire 151 of the wheel assembly 150 is positioned inside the strut 160, while the suspension arm 154 and right frame beam 122 are positioned outside the strut 160.

Figure 6:
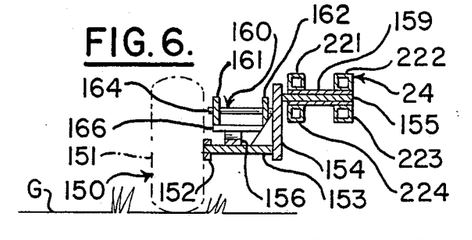
FIG. 6 is a cross-sectional view of one of the wheel assemblies in position for transport taken along lines 6—6 of FIG. 5.

With continuing reference to FIGS. 5 and 6, the spring 156 is mounted with its midsection bearing on the top of the axle 153 and with its curled end 157 extending upwardly between the bars 161, 162 of strut 160 to a mounting in bracket 167. The bracket 167 is rigidly attached to and extends upwardly a short distance from the strut 160 and the curled end 157 of spring 156 is pivotally attached to the bracket 167 by the pivot pin 169. The opposite curved end 158 of spring 156 extends forwardly from the axle 153 to a position near the proximal end of strut 160. A bearing plate 166 rigidly affixed to the underside of bars 161, 162 of strut 160 bears the weight of the base frame assembly 120 on the curved end 158 of spring 156. In this manner, the weight of the portable hoist 10 is transferred to the axle 153 of the wheel assembly 150 by the leaf spring 156.

The mounting shaft 155 in sleeve 159 does not have to bear any significant weight of the portable hoist 10, but only maintains the wheel assembly 150 in proper longitudinal position and allows the suspension arm 154 to pivot around the axis of shaft 155 and sleeve 159. It can also be appreciated by reference particularly to FIG. 6 that when the portable hoist 10 is in this folded configuration for transport on the wheels, the position of the strut 160 between the suspension arm 154 and tire 151 effectively prevents the shaft 155 from being withdrawn or pulled out of the sleeve 159. Therefore, in this position, the wheel assembly 150 cannot be removed from the frame 24, and it cannot fall out of this mounting assembly configuration during transport. Yet the wheel assembly 150 and spring 156 provide a soft, spring-like suspension for the portable hoist 10 during transport, since the spring bears on the axle 153 and the pivot arm 154 can pivot about the axis of shaft 155 in sleeve 159.

With reference primarily to FIG. 5, the proximal end of strut 160 is pivotally attached by pin 164 to a rigid mounting structure 168, which is attached to the tubular frame members 121, 124 of right frame beam 24. The hydraulic cylinder 52 is also mounted on that same pivot pin 164 between the bars 161, 162 of strut 160. The lower end of the lift arm 56 is pivotally attached by pin 165 to the distal end of strut 160 and extends upwardly and forwardly over the hydraulic cylinder 52. The rod end 53 of the hydraulic cylinder 52 is attached to the midsection of the lift arm 56 by a pin 173. The upper end of lift arm 56 is pivotally attached by pin 173 to a mounting ear 179, which is rigidly affixed to a transverse cross-beam 114 of the platform assembly 30.

Figure 8:
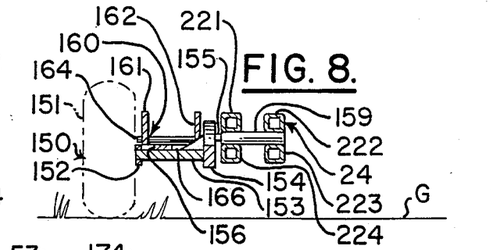
FIG. 8 is a cross-sectional view of the partially collapsed wheel assembly taken along FIGS. 8—8 of FIG. 7.

FIG. 7 illustrates the movements and functions of the components as the rod 53 of hydraulic cylinder 52 begins to extend to raise the platform assembly 30 above the base frame assembly 20. In conjunction, FIG. 8 illustrates how the wheel assembly 150 allows the frame member 24 of base frame assembly 20 to simultaneously collapse downwardly toward the ground G as the platform assembly 30 is raised. Specifically, the rod 53 of hydraulic cylinder 52 forces the lift arm 56 to pivot about the pin 169 at the distal end of strut 160. Therefore, the upper end of the lift arm 56 pushes the platform assembly 30 upwardly in relation to the base frame assembly 20, as indicated by the arrow 102 in FIG. 7. As this lifting action occurs, the lift arm 56 pulls upwardly on the distal end of strut 160, causing it to pivot upwardly about its mounting pin 164 at its proximal end. This upward movement of the distal end of strut 160, of course, carries the pinned end 157 of spring 156 upwardly as well, which allows the suspension arm 154 to pivot about the axis of mounting shaft 155. The result is that while the platform assembly 30 is raised upwardly, as indicated by arrow 102, the base frame assembly 20 simultaneously settles downwardly, as indicated by arrow 104 in relation to the axle 153 of wheel assembly 150. In other words, since the tire 151 and hub 152 of the wheel assembly 150 maintain a fixed distance between the axle 153 and the ground G, the base frame assembly 20 has to settle toward the ground G as the suspension arm 154 pivots upwardly around the axis of shaft 155.

As the rod 53 of hydraulic cylinder 52 continues to extend, as illustrated in FIG. 9, the platform assembly 30 continues to raise higher above the base frame assembly 20. Concurrently, the base frame 20 continues to settle until it rests directly on the ground G, as shown in FIG. 9. At this point, a slight additional extension of cylinder rod 53 lifts the pinned end 157 of spring 156 enough so that the spring 156 bears no more weight or force or the axle 153 of the wheel assembly 150. Therefore, in this raised position shown in FIG. 9, all of the weight of the portable hoist 10 is born by the base frame assembly 20 resting directly ground G and none of the weight is on the suspension and wheel assembly 150. Therefore, the components of the wheel assembly 150 and spring 156, illustrated still in their mounted position by phantom lines in FIG. 9, are not bearing any weight and can be removed freely and easily.

To accomplish this removal, the pin 169 is first removed from the end 157 of spring 156, so that the spring 156 can be removed from the portable hoist 10 and laid aside, as shown in FIG. 9. Then, since the spring 156 is removed, and the strut 160 is raised above the suspension arm 154, the entire wheel assembly 150 can simply be removed by sliding the shaft 155 out of the sleeve 159 and laying the wheel assembly 150 aside and out of the way. Since none of the spring 156 or wheel assembly 150 components bear any weight of the hoist structure in this position, this removal process is exceptionally easy and can be accomplished very quickly with virtually no effort.

The next step, after removing the spring 156 and wheel assembly 150, as described above, is to reverse the action of the lift assembly 40 by retracting the rod 53 into the hydraulic cylinder 52, thus lowering the platform assembly 30 onto the base frame assembly 20. After the lift assembly 40 collapses and the platform assembly 30 is lowered to a position directly over the base frame assembly 20 without the wheel assembly 150 in place, the ramp platform channels 34, 35 and the extension channels 36, 37 can be folded out to their use positions, as shown in FIG. 10. In this use configuration, as shown in FIG. 10, a vehicle V can be driven onto the platform assembly 30. However, prior to driving the vehicle V onto the platform assembly 30, the chock assembly 90 must be removed. Also, the platform assembly 30 is constructed in such a way that the ramp channels 34, 35, the platform channels 32, 33, and the extension channels 36, 37 can be moved inwardly and outwardly on the transverse cross beams frame members 112, 113, 114 to adjust the spacing to fit the wheel spacing of the particular vehicle that is to be driven onto the platform assembly 30. In other words, the assembly comprising the ramp channel 34, platform channel 32, and extension channel 36 can be moved inwardly to the alternate positions illustrated in broken lines in FIG. 10 as 34', 32', 36', respectively. Similarly, the assembly comprising the ramp channel 35, platform channel 33, and extension channel 37 can be moved inwardly to alternate positions illustrated in broken lines 35', 33', 37', respectively. This inward and outward adjustment of the channels is possible because they are constructed in such a manner that the platform channels 32, 33 merely lay on, but are not affixed to, the frame members 110, 111, 112, 113, 114 of platform assembly 30. The ramp channels 34, 35, and extension channels 36, 37, as described above, are pivotally attached to the ends of the platform channels 32, 33, but only bear against, without attachment to, the front and rear platform frame members 112, 113, respectively.

The removable chock assembly 90 is best shown in FIG. 14 mounted on the right ramp platform 35 and blocking a tire T of a vehicle positioned on the platform assembly 30. As shown in FIG. 14, the upper edges 38, 39 of ramp channel 35 are curled outwardly to form elongated shoulders. A plurality of cleats 89 are rigidly affixed to, and extend a short distance upwardly from, the tops of the ridges 38, 39. The chock assembly 90 is comprised of an outer tube 91 and an inner tube 93 assembled in telescoping relation to each other with the inside tube 93 slideably inserted into one end of the outside tube 91. A wide tire engaging plate 92 is rigidly affixed to, and extends radially upward from, the outside sleeve 91.

An outside anchor 94 is rigidly attached to the outside end of tube 91, and a similar inside anchor 95 is rigidly attached to the exposed end of inside tube 93. While the drawing in FIG. 14 does not allow a complete illustration of the outside anchor member 94, suffice it to say that it is essentially the same in structure as the inside anchor 95. The inside anchor 95 is comprised of a short arm 96 rigidly attached to, and extending downwardly from, the exposed end of tube 93. A collar 97 rigidly is affixed to, and protrudes from, the other end of arm 96 to a position under the ridge 39 of ramp platform 35.

A coiled tension spring 100 is positioned inside the tubular members 91, 93. This spring 100 is anchored at one end to the outside tube member 91 by a pin 98, and it is anchored at the other end to the inside tube member 93 by pin 99. Therefore, the spring 100 biases the inside tube 93 in such a manner as to be pulled into the outside tube 91. This spring bias tends to pull the outside anchor 94 and the inside anchor 95 toward each other. In this position, with the chock assembly 90 bearing against a pair of cleats 89 and with the anchors 94, 95 bearing against the under sides of the ridges 38, 39, respectively, the chock assembly 90 cannot move, and the tire T cannot roll down the ramp channel 35.

However, the chock assembly 90 can be removed easily from the ramp channel 35, or it can be repositioned on the ramp channel 35 simply by pulling the inside anchor 95 longitudinally away from the outside tube 91 a sufficient distance for the shoulder 97 to clear the ridge 39 of ramp channel 35. With the anchor 95 pulled to this extended position, as shown by broken lines 95', the chock assembly 90 can be removed from the ramp channel 35 or repositioned to a different cleat 89 upwardly or downwardly on the ramp channel 35.

Of course, since the portable hoist 10 of this invention is intended for holding a vehicle aloft while a person works under the vehicle, some checks are desirable to prevent the hoist from collapsing while the person is under the vehicle. In this regard, a restriction can be positioned in the fluid outlets of the hydraulic cylinders to throttle the outflow of hydraulic fluid, thus allowing only a slow descent of the platform frame assembly 30 and vehicle V. However, another significant feature of the portable hoist according to this invention is the safety latch assembly 60, which is provided to protect against unintended or accidental lowering of the platform assembly 30. This safety latch feature is best described by reference to FIGS. 12 and 13. It was described above that the right frame beam 24 is comprised of four elongated tubular frame members 221, 222, 223, 224. Likewise, the left frame beam 22 is comprised of four elongated tubular frame members 211, 212, 213, 214. The roller assembly 242 at the bottom end of scissors arm 42 is positioned to roll in the space between the upper frame members 211, 212 and the lower frame members 213, 214 as the lift assembly 40 raises and lowers the platform assembly 30. Specifically, as the platform 30 is raised by the hydraulic cylinders 50, 52, the roller assembly 242 at the bottom end of scissors arm 42 moves rearwardly, as indicated by arrow 78. On the other hand, as the platform assembly 30 is lowered, the roller assembly 242 translates forwardly, as indicated by the arrow 79. Likewise, the roller assembly 240 in frame beam 24, which because of intervening component parts cannot be seen in FIGS. 12 and 13, also moves rearwardly and forwardly in the same manner as roller assembly 242 as the platform assembly 30 is raised upwardly and lowered downwardly.

Figure 12:
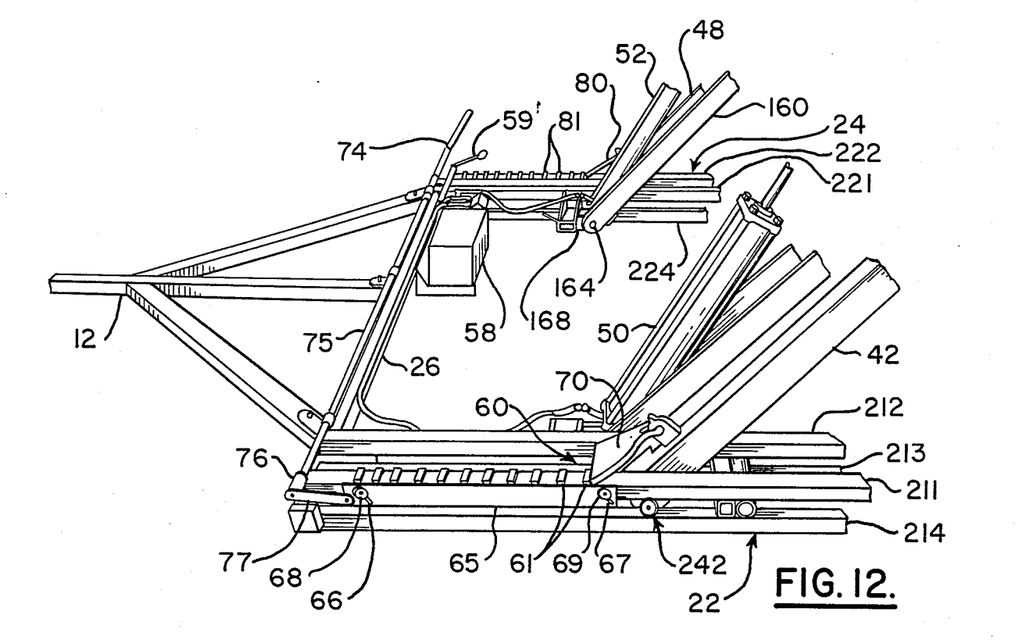
FIG. 12 is a perspective view of the front portion of the base frame assembly showing a portion of the lift assembly fully raised in combination with the safety latch features according to this invention.
Figure 13:
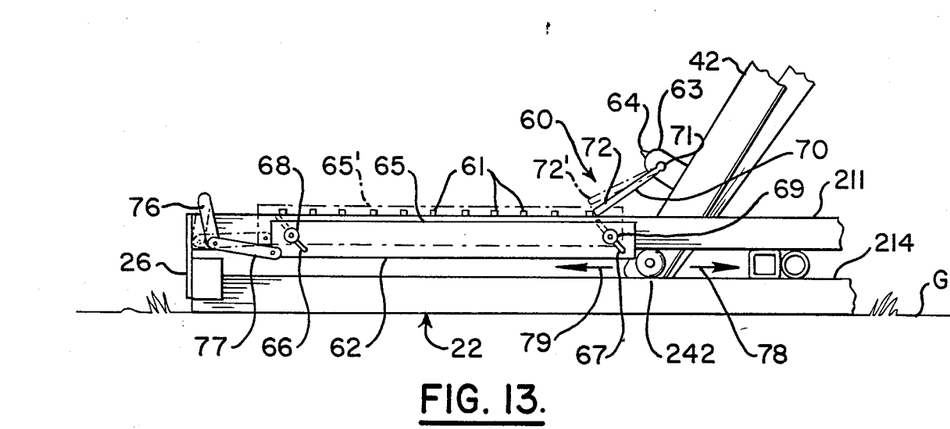
FIG. 13 is an enlarged elevation view of the safety latch assembly on the left side of the base frame assembly.

For purposes of describing this safety latch 60 of the invention, a detailed description of the components on the left frame beam assembly 22 will be made, although it is to be understood that a similar safety latch structure can also be positioned on the right frame beam assembly 24. Therefore, as shown in FIGS. 12 and 13, a plurality of cogs 61 are rigidly affixed to, and extend upwardly from, the top surface of the elongated frame member 211. A pawl 70 is pivotally attached at its proximal end 71 to a bracket 63, which bracket 63 is rigidly affixed to the scissors arm 42. The distal end 72 of the pawl 70 extends downwardly and forwardly into engagement with one of the cogs 61. An ear 64 on the tip of bracket 63 can prevent the pawl 70 from pivoting to an upward position where it would be ineffective to engage cogs 61.

It is apparent from the above description and the illustrations in FIGS. 12 and 13 that as the scissors arm 42 and roller assembly 242 move rearwardly in the direction of arrow 78 while the platform assembly 30 is being raised, the distal end 72 of the pawl 70 can ride over the tops of the cogs 61 so that there is no inhibiting of the raising action. On the other hand, in order to lower the platform assembly 30, the scissors arm 42 and roller assembly 242 must move forwardly in the direction of arrow 79. This forward motion can be effectively prevented by the engagement of the distal end 72 of pawl 70 with any one of the cogs 61. Therefore, the platform assembly 30 cannot be lowered unless the distal end 72 of pawl 70 is disengaged from the cogs 61.

Of course when it is not desired that the platform assembly 30 be lowered, the pawl 70 can be left in place so that the platform assembly 30 cannot be lowered. However, when it is desired that the platform assembly 30 be lowered, a derailer bar 62 is provided to raise the distal end 72 of the pawl 70 above the tops of cogs 61 so that the pawl 70 cannot engage cogs 61. Specifically, as best seen in FIG. 13, the derailer bar 62 is mounted on the side of beam member 211 and adjacent the cogs 61.

The derailer bar 62 is retained on the beam member 211 by a pair of pins 68, 69, which extend through a pair of slotted holes 66, 67 in derailer bar 62. As shown in this embodiment, it is preferred that the slotted holes 66, 67 are slanted to extend downwardly and rearwardly from the pins 68, 69 when the derailer bar 62 is in its normal position. Therefore, when the derailer bar 62 is pulled forwardly, the pins 68, 69 bearing against the sides of the slanted, slotted holes 66, 67, thereby causing the derailer bar 62 to not only move forwardly, but also to raise upwardly so that its top surface 65 is raised above the cogs 61 to the position indicated by phantom lines 65' in FIG. 13. When the derailer bar 62 is moved to this alternate position 65' above the cogs 61, it pushes the distal end 72 of the pawl 70 to the raised position indicated by the phantom lines 72' in FIG. 13. In this raised position, the distal end 72 of pawl 70 merely slides along the upper surface 65 of the derailer bar 62 above the cogs 61 so that it cannot engage the cogs 61. Therefore, there is no constraint by the pawl 70 on the forward movement of the scissors arm 42 in the direction of arrow 79, thus there is no constraint against the lowering of the platform assembly 30.

The raising of derailer bar 62, as described above, can be accomplished by manipulating a handle lever 74 to rotate an elongated bar 75, which is mounted on the front frame member 26 of the base frame assembly 20. A short lever arm 76 is rigidly attached to the end of the rotatable bar 75 that is adjacent the front end of the derailer bar 62. A short link 77 pivotally attached to the arm 76 and to the front edge of the derailer bar 62 connects the lever arm 76 to the derailer bar 62. Therefore, when the handle lever 74 is pushed rearwardly, the lever arm 76 pulls the link 77 and the derailer arm 62 forwardly so that it slides upwardly in the slotted holes 66, 67 to accomplish the derailment of the pawl as described above. As soon as the handle lever 74 is released, the weight of the derailer bar 62 causes it to drop to its normal position where it does not interfere with the normal engagement of the pawl 70 with a cog 61.

As shown in FIG. 12, the handle lever 74 can be advantageously positioned adjacent the hydraulic control lever 59, which lever 59 actuates the hydraulic pump and valve assembly 58 to operate the hydraulic cylinders 50, 52. Therefore, when it is desired to lower the platform assembly 30, the operator can manipulate the hydraulic actuator lever 59 to the appropriate lowering mode while he can also conveniently manipulate the lever handle 74 to derail the pawl 70 so that it does not engage the cog 61 during the lowering action. However, when the operator does not desire such lowering, the derailer bar 62 naturally settles to the position shown in FIG. 13 where the pawl 70 does engage the cog 61 and prevents the lowering of the platform assembly 30.

As explained above, there can be a similar safety latch structure comprising cogs 81 and pawl 80 on the left side of the frame assembly as shown in FIG. 12. Since the derailer bar and linkages associated with the assembly of the pawl 80 and cogs 81 on the left frame member 24 cannot be seen in illustrations of FIGS. 12 an 13, they are not further described. However, it is understood that they are comparable to those features and components of safety latch 60 described above and operate in the same manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

The embodiments of the invention in which an exclusive property or privilege is claimed are defined as follows:

1. Portable hoist apparatus for lifting a vehicle above the ground, comprising:
   a base frame assembly;
   a platform frame assembly positioned above the base frame assembly, all of said platform frame assembly being moveable upwardly and downwardly in relation to said platform frame assembly;
   lift means connected to the base frame assembly and to the platform frame assembly for lifting and lowering the entire platform frame assembly in relation to the base frame assembly;
   axle mans connected to said base frame assembly in such a manner that said axle means is moveable upwardly and downwardly in relation to said base frame assembly and a wheel rotatably mounted on said axle means for supporting the base frame assembly when attached, said axle mans being attached to said base frame assembly in such a manner that it is moveable upwardly and downwardly in relation to said base frame assembly, and wherein said lift means includes a component that bears on said axle means in such a manner that pushes said axle means downwardly in relation to said base frame assembly when said platform frame assembly is lowered and allows said axle means to raise upwardly in relation to said base frame assembly when said platform frame assembly is raised;
   hitch means attached to the base frame assembly for towing the hoist apparatus; and
   vehicle support means on said platform frame assembly for supporting a vehicle on the hoist.

2. The portable hoist apparatus of claim 1, wherein said lift means can allow said axle means to raise a sufficient amount so that said base frame assembly collapses all the way to ground, in which position said axle means and said wheel do not support said base frame assembly and can be removed.

3. The portable hoist apparatus of claim 2, wherein said suspension and wheel means includes a spring positioned between said lift means component and said axle means.

4. The portable hoist apparatus of claim 3, wherein said axle means includes a horizontal axis shaft on which said wheel is mounted, a horizontal mounting shaft offset from said axle shaft, said mounting shaft being pivotally and removably connected to said base frame assembly, and a suspension arm rigidly connected between said mounting shaft and said axle shaft, said spring being attached to said lift means component and positioned to bear on said axle shaft.

5. The portable hoist apparatus of claim 4, wherein said suspension and wheel means includes a cylindrical sleeve affixed to said base frame assembly and said mounting shaft is slideably and pivotally inserted into said sleeve.

6. The portable hoist apparatus of claim 5, wherein said suspension arm is positioned between said base frame assembly and said lift means component when the platform frame assembly is lowered so that said mounting shaft cannot be removed from said sleeve, and said lift means component raises upwardly above said base frame assembly and above said suspension arm when said platform frame assembly is raised so that said mounting shaft can be slideably removed from said sleeve.

7. Portable hoist apparatus for lifting a vehicle with wheels above the ground, comprising:
a base frame assembly;
a platform frame assembly positioned above the base frame assembly;
a pair of elongated, upwardly-opening platform channels positioned in parallel, spaced apart relation to each other on the platform frame assembly for receiving and retaining the vehicle's wheels when it is positioned on the hoist;
a pair of elongated, upwardly-opening ramp channels positioned in parallel, spaced-apart relation to each other, one end of each of said ramp channels being pivotally attached to an end of one of said platform channels and being foldable about said pivotal attachment between a folded position with the ramp channel positioned upwardly and over the platform channel to which it is pivotally attached and an extended position with the ramp channel extending outwardly and downwardly from the platform channel to which it is attached, said pivotal attachment including a first plate rigidly affixed to, and extending downwardly from, one side of the platform channel, a second plate rigidly affixed to, and extending downwardly from, the other side of the platform channel, a third plate rigidly affixed to one side of the ramp channel, and a fourth plate rigidly affixed to the other side of the ramp channel, said third and fourth plates being oriented to extend downwardly from the ramp channel adjacent the first and second plates when said ramp channel is in said extended position with the tops of said first and third plates being pivotally connected together and the tops of said second and fourth plates being pivotally connected together; and
lift means connected to the base frame assembly and to the platform frame assembly for lifting and lowering the platform frame assembly in relation to the base frame assembly.

8. The portable hoist apparatus of claim 7, including a pair of elongated, upwardly-opening extension channels, each of which is pivotally connected to the end of a platform channel that is opposite the end of the platform channel to which the ramp channel is pivotally connected.

9. The portable hoist apparatus of claim 7, wherein said platform channels are movably adjustable toward and away from each other.

10. The portable hoist apparatus of claim 7, wherein said first and third plates and said second and fourth plates bear against platform frame assembly when said ramp channel is in said extended position.

11. The portable hoist apparatus of claim 7, wherein portions of said first and third plates bear against each other and portions of said second and fourth plates bear against each other when said ramp channel is in said extended position.

12. Portable hoist apparatus for lifting a vehicle above the ground, comprising:
a base frame assembly;
a platform frame assembly positioned above the base frame assembly;
an elongated, upwardly-opening ramp channel extending outwardly and downwardly from said platform frame assembly; and
a chock assembly removably attached to said ramp channel for preventing a vehicle on the hoist from rolling off the hoist, said chock assembly including an elongated outside tube member, an elongated inside tube member telescopically slidable into one end of said outside tube member, bias means for yieldably biasing said inside tube member into said outside tube member, a first anchor member extending downwardly from the end of said inside tube member that is not inserted into said outside tube member and a second anchor member extending downwardly from said outside tube member, a first collar extending from a lower end of said first anchor member inwardly toward said second anchor member, and a second collar extending from a lower end of said second anchor member inwardly toward said first anchor member such that a portion of the ramp is grasped between said first and second collars.

13. The portable hoist apparatus of claim 12, wherein said ramp channel has two upwardly extending sidewalls on opposite sides, each sidewall having a widened ridge on its upper edge, and said anchor means being adapted to extend downwardly alongside said sidewalls and inwardly under said ridges, said ridges also having cleats on their top surfaces for engaging said chock.

14. The portable hoist apparatus of claim 12, including a plate rigidly attached to and extending upwardly from said outside tube member.

15. Portable hoist apparatus for lifting a vehicle above the ground, comprising:
a base frame assembly;
a platform frame assembly positioned above the base frame assembly;
lift means connected to the base frame assembly and to the platform frame assembly for lifting and lowering the platform frame assembly in relation to the base frame assembly, said lift means including a scissors-shaped stabilizer support assembly including a cross-frame comprised of first and second elongated scissors arms pivotally connected together at their midsection, a first end of the first of said scissors arms being pivotally connected to the rear portion of said base frame assembly and a first end of the second of said scissors arms being pivotally connected to the rear portion of said platform frame assembly, the second end of said first scissors arm being connected to the forward portion of said platform frame assembly in such a manner that it is translatable only forwardly and rearwardly, but not upwardly and downwardly, in relation to said platform frame assembly as said platform frame assembly is lifted and lowered, the second end of said second scissors arm being connected to the forward portion of said base frame assembly in such a manner that it is translatable only forwardly and rearwardly, but not upwardly and downwardly, in relation to said base frame assembly as said platform frame assembly is lifted and lowered; and
latch means on one of said scissors arms for selectively preventing and allowing said translation of said scissors arm and thus selectively preventing and allowing said lowering of said platform frame assembly in relation to said base frame assembly.

16. The portable hoist apparatus of claim 15, wherein said latch means is at said second end of said scissors arm and includes a plurality of cogs on said base frame assembly adjacent said second end of said second scissors arm, pawl means on said second end of said second scissors arm for engaging said cogs and preventing forward translation of said second end of said second scissors arm, and disengaging means for disengaging said pawl means from said cogs when it is desired to lower said platform frame assembly.

17. The portable hoist apparatus of claim 16, wherein said pawl means includes a rigid pawl having a proximal end and a distal end, said proximal end being pivotally connected to said second end of said second scissors arm and said distal end positioned to engage said cogs during forward translation and to cam over said cogs during rearward translation.

18. The portable hoist apparatus of claim 17, wherein said disengaging means includes a derailer bar positioned adjacent said cogs and under the distal end of said pawl, said derailer bar being movable upwardly and downwardly a sufficient distance to raise the distal end of said pawl above said cogs to prevent engagement when forward translation is desired and to allow the distal end of the pawl to drop into engagement with said cogs when forward translation is not desired.

19. The portable hoist apparatus of claim 18, wherein said derailer bar has an elongated slotted hole therethrough, which slotted hole is slanted at an acute angle from vertical, and a bolt is inserted through said slotted hole and rigidly affixed to said base frame assembly such that a forward pull on said derailer bar causes it to ride upwardly on said bolt a sufficient amount to disengage said pawl from said cogs.

20. The portable hoist apparatus of claim 19, including lever actuator means connected to said derailer bar for pulling forward on said bar when disengagement of said pawl from said cogs is desired.

21. Portable hoist apparatus for lifting a vehicle above the ground, comprising:
  a base frame assembly;
  a platform frame assembly positioned above the base frame assembly and moveable upwardly and downwardly in relation to the base frame assembly;
  suspension and wheel means attached to the base frame assembly for supporting the base frame assembly above the ground, said suspension and wheel means being selectively raiseable and lowerable for selectively lowering the base frame assembly to the ground and raising the base frame assembly above the ground;
  lift means connected together with the base frame assembly, the platform frame assembly, and the suspension and wheel means for sequentially lowering the base frame.

22. The portable hoist apparatus of claim 21, wherein said lift means includes:
  an elongated strut with a proximal end pivotally connected at a first pivotal connection axis to said base frame assembly and a distal end extending rearwardly from said first pivotal connection axis;
  an elongated lift arm with a proximal end pivotally connected at a second pivotal connection axis to said platform frame assembly and a distal end extending rearwardly from said second pivotal connection axis, said second pivotal axis being positioned generally above and parallel to said first pivotal connection axis, and said respective distal ends of said strut and said lift arm being pivotally connected together at a third pivotal connection axis that is positioned generally rearward of, and parallel to, said first and second pivotal connection axis; and
  a hydraulic cylinder having a blind end and a rod end comprised of a hydraulically extendable and retractable rod, the rod end being pivotally connected to said lift arm at a fourth pivotal connection axis positioned generally between said second and third pivotal connection axes, and the blind end being pivotally connected to said base frame assembly.

23. The portable hoist apparatus of claim 22, wherein the blind end is pivotally connected to said base frame assembly at said first pivotal connection axis.

24. The portable hoist apparatus of claim 22, wherein said suspension and wheel means includes axle means attached to said base frame assembly under said strut in such a manner that said axle means is movable upwardly and downwardly in relation to said base frame assembly, and a wheel rotatably mounted on said axle means for supporting said base frame assembly above the ground, said strut being positioned to bear on said axle means to push said wheel downwardly when said rod is retracted into the cylinder and to raise the wheel allowing said base frame assembly to settle to the ground when said rod is extended from said cylinder.

25. The portable hoist apparatus of claim 24, including spring means connected to said strut and positioned between said strut and said axle means for cushioning the bearing of said strut on said axle means.

26. The portable hoist apparatus of claim 24, wherein said axle means includes an axle shaft with said wheel rotatably mounted on said axle shaft, a mounting shaft parallel to, and offset from, said axle shaft, a suspension arm extending between and attached to said axle shaft and said mounting shaft, and pivotal connection means for pivotally connecting said mounting shaft to said base frame assembly.

27. The portable hoist apparatus of claim 26, wherein said pivotal attachment means includes an elongated sleeve affixed to said base frame assembly and said mounting shaft is removably slideable into said sleeve such that said suspension and wheel means is removable from said base frame assembly by sliding said mounting shaft out of said sleeve.

28. The portable hoist apparatus of claim 27, wherein said suspension arm is positioned between said strut and said base frame assembly when said rod is retracted and said wheel is down so that the mounting shaft cannot be removed from said sleeve, and wherein said strut is raised above said suspension arm when said rod is extended so that said mounting shaft can be removed from said sleeve when said wheel is raised in relation to said base frame assembly.

29. In a trailer apparatus having a base frame assembly and a wheel connected to the base frame assembly for supporting the base frame assembly above the ground, the improvement comprising:
  a horizontal axle shaft with said wheel rotatably mounted on said axle shaft;
  a horizontal mounting shaft that is laterally and axially offset from said axle shaft;
  a suspension arm extending between, and attached to, said axle and mounting shafts;
  a sleeve affixed to said base frame assembly for slideably receiving and rotatably retaining said mounting shaft in such a manner that said mounting shaft can be slideably removed from said sleeve and such that said axle shaft is pivotal upwardly and downwardly about the axis of the sleeve when said mounting shaft is positioned in the sleeve; and lift means on said base frame assembly for moving said axle means and said wheel upwardly and downwardly in relation to said base frame assembly to a sufficient extent that said base frame assembly can be lowered to the ground, said lift means having a strut that is moveable upwardly and downwardly in relation to the base frame assembly and is positioned to bear on said axle shaft to move said axle shaft and said wheel upwardly and downwardly in relation to said base frame assembly, said strut being positioned in such a manner as to prevent removal of said mounting shaft from said sleeve when said axle shaft and wheel are lowered in relation to said base frame assembly and said strut is positioned in such a manner as to allow removal of said mounting shaft from said sleeve when said axle shaft and wheel are raised.

30. The improvement of claim 29, wherein said suspension arm is positioned between said strut and said base frame assembly when said wheel and axle shaft are lowered and said strut is raised above said mounting shaft and above said suspension arm when said wheel and axle shaft are raised.

31. The improvement of claim 29, including a spring positioned between said strut and said axle shaft.

* * * * *

UNITED STATES PATENT AND TRADEMARK OFFICE
CERTIFICATE OF CORRECTION

PATENT NO. : 4,901,980
DATED : Feb. 20, 1990
INVENTOR(S) : N. Larry Hansen

It is certified that error appears in the above-identified patent and that said Letters Patent is hereby corrected as shown below:

In column 4, line 33, change "he" to --the--.

In column 5, line 1, change "plate" to --plates--.

In column 5, line 4, change "plate" to --plates--.

In column 5, line 25, change "135" to --133--.

In column 8, line 33, change "an" to --and--.

In column 14, line 16, change "platform" to --base--.

In column 14, line 26, change "mans" to --means--.

Signed and Sealed this

Sixteenth Day of July, 1991

*Attest:*

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,901,980

DATED : February 20, 1990

INVENTOR(S) : N. Larry Hansen

It is certified that error appears in the above-identified patent and that said Letters Patent is hereby corrected as shown below:

In column 17, line 55, after "frame" add --assembly to the ground and raising the platform frame assembly above the base frame assembly; and vehicle support means on said platform frame assembly for supporting a vehicle on the hoist--.

Signed and Sealed this

Seventeenth Day of March, 1992

Attest:

HARRY F. MANBECK, JR.

*Attesting Officer*      *Commissioner of Patents and Trademarks*